Aug. 2, 1966  G. J. MacKEOWN  3,263,744
SHAVE CREAM HEATERS
Filed March 8, 1965

INVENTOR.
GRAEME J. MacKEOWN
BY
Joseph Alan Fenlon, Jr.

United States Patent Office 3,263,744
Patented August 2, 1966

3,263,744
SHAVE CREAM HEATERS
Graeme J. MacKeown, Overland, Mo.
(9702 Lynntown Court, St. Louis, Mo.)
Filed Mar. 8, 1965, Ser. No. 437,815
5 Claims. (Cl. 165—47)

This invention relates to Shave Cream Heaters.

It is the object of this invention to provide a shave cream heater in which shaving cream is passed through a passageway from an aerosol type can to the consumer, and in which heat is stored in elements contained within the passageway so that as the shave cream passes therethrough, the shaving cream becomes heated.

With the above and other objects in view, which will become immediately apparent upon reading the specification, my invention resides in the unique and novel form, arrangement, construction and combination of the various parts and elements described in the accompanying drawings of specification and claimed in the claims.

Figure 2:
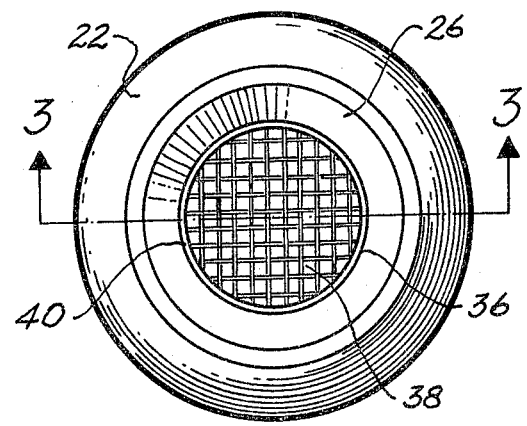
FIGURE 2 is an enlarged top plan view of the shave cream heater embodying the present invention.
Figure 1:
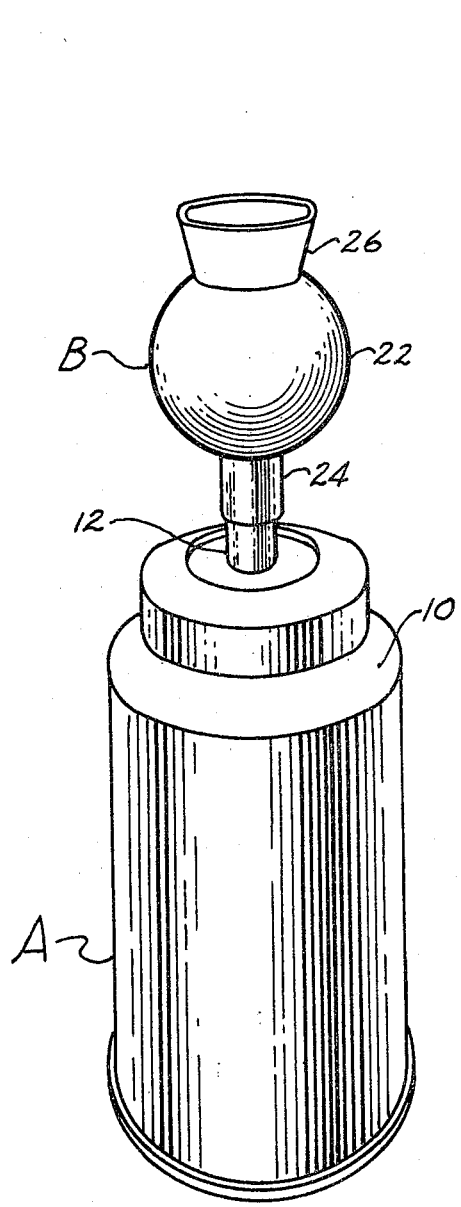
FIGURE 1 is a front perspective view of a shave cream heater attached to a can of shave cream.

Referring now in more detail, and by reference character to the drawings which represent a preferred embodiment of the present invention. A designates a container comprising a metallic can 10 containing shaving cream under pressure and also being provided with an upwardly projecting post 12. Conventionally the can 10 is adapted for discharging its contents upon pivotal movement of the post 12.

Figure 3:
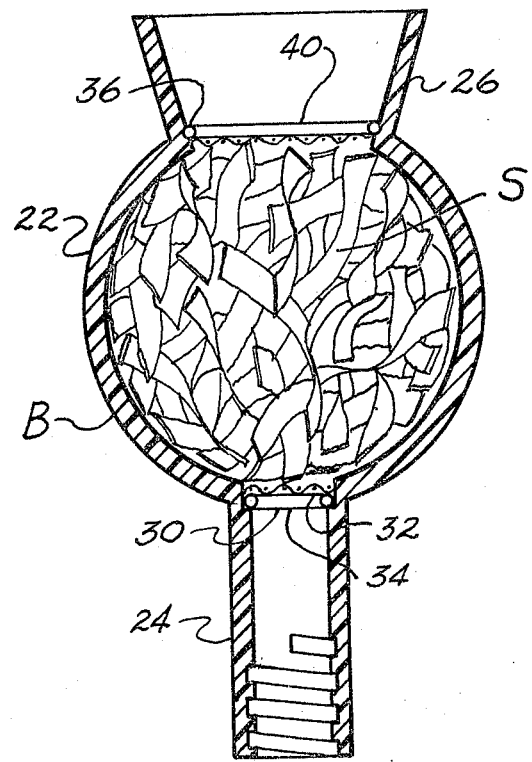
FIGURE 3 is a sectional view taken along lines 3—3 of FIGURE 2.

Attached to the end of the post 12 is a shaving cream heater B comprising an elongated shell 20 including a centrally located globe 22, an elongated neck 24, and an outwardly flared mouth 26. The neck 24 is tubular and is internally threaded for removable attachment to the post 12. The inner end of the neck 24 is recessed and disposed in the recessed portion of the neck 24 is a screen 30 comprising a mesh portion 32 and a ring 34. Simultaneously, the inner end of the flared mouth 26 is recessed and disposed in the recessed portion of the mouth 26 is a screen 36 comprising a mesh portion 38 and a ring 40. Compactly disposed in the shell 22 and retained therein between the screens 30, 36, are metallic shavings S as can be best seen in FIGURE 3.

In use, the heater B is removed from the can A and placed under a running hot water tap where hot water is permitted to run through the mouth 26, the globe 22, and the neck 24. This causes the shavings S to become heated. Immediately thereafter, the neck 24 is secured to the post 12. When shaving cream is emitted from the can A, it passes through the neck 24, the globe 22 and the mouth 26. As the shaving cream passes through the globe 22, heat which was stored in the shavings S is transferred from the metallic shavings to the shaving cream, and the shaving cream emerges from the mouth 26 at a warm and comfortable temperature.

It should be understood that changes in the form, arrangement and combination of the various parts shown and herein described may be made and substituted without departing from the nature and principle of my invention.

Having thus described my invention, what I claim and desire to secure by Letters Patent is described in the following claims.

1. A heating device for use with a container provided with a post and adapted for emitting the contents of the container upon movement of the post, said heating device comprising a tubular neck portion, a hollow globe, an outwardly flaring mouth portion, said neck portion and mouth portion each being integrally connected to the globe to define a passageway through the neck portion into the globe and thereafter out of the mouth portion, attachment means integrally included in the neck portion for removable securing the device to the post, a first screen removably disposed in the passageway adjacent the juncture of the neck portion and the globe, a second screen removably disposed in the passageway adjacent the juncture of the mouth portion and the globe, heat exchange means disposed within the globe for altering the temperature of the contents of the can as said contents are urged through the globe, said heat exchange means being retained within the globe by the first and second screens, and means for selectively urging the contents of the can through the passageway, the screens and the heat exchange means.

2. The device of claim 1 wherein the neck portion, the globe, and the mouth portion are all figures of revolution about a singular longitudinal axis.

3. The device of claim 1 wherein the heat exchange means is a plurality of metallic strips randomly dispoted in the globe between the first and second screens.

4. The device of claim 3 wherein the first screen comprises a mesh element and a ring which is disposed in an annular recess in the neck portion adjacent the globe.

5. The device of claim 4 wherein the second screen comprises a mesh element and a ring which is disposed in an annular recess in the mouth portion adjacent the globe.

References Cited by the Examiner

UNITED STATES PATENTS

| | | | |
|---|---|---|---|
| 2,586,250 | 2/1952 | Parker | 165—10 X |
| 3,069,528 | 12/1962 | Gardner | 222—146 X |
| 3,095,122 | 6/1963 | Lewiecki et al. | 222—146 |
| 3,116,403 | 12/1963 | Carter | 222—146 X |
| 3,171,572 | 3/1965 | Reich et al. | 165—1 X |

ROBERT A. O'LEARY, Primary Examiner.

M. A. ANTONAKAS, Assistant Examiner.